No. 643,135. Patented Feb. 13, 1900.
W. D. HOOKER.
AIR COMPRESSOR.
(Application filed May 29, 1899.)
(No Model.)

Inventor:—
Wm. D. Hooker:
By Stanley Stoner
Atty.

THE NORRIS PETERS CO., PHOTO-LITHO., WASHINGTON, D. C.

UNITED STATES PATENT OFFICE.

WILLIAM D. HOOKER, OF ST. LOUIS, MISSOURI.

AIR-COMPRESSOR.

SPECIFICATION forming part of Letters Patent No. 643,135, dated February 13, 1900.

Application filed May 29, 1899. Serial No. 718,661. (No model.)

*To all whom it may concern:*

Be it known that I, WILLIAM D. HOOKER, a citizen of the United States, residing at the city of St. Louis, State of Missouri, have invented certain new and useful Improvements in Air-Compressors, of which the following is a specification.

My invention relates to certain improvements which secure a circulation of water about the compressor-cylinders. The novel features will be hereinafter specifically pointed out and claimed.

Figure 1:
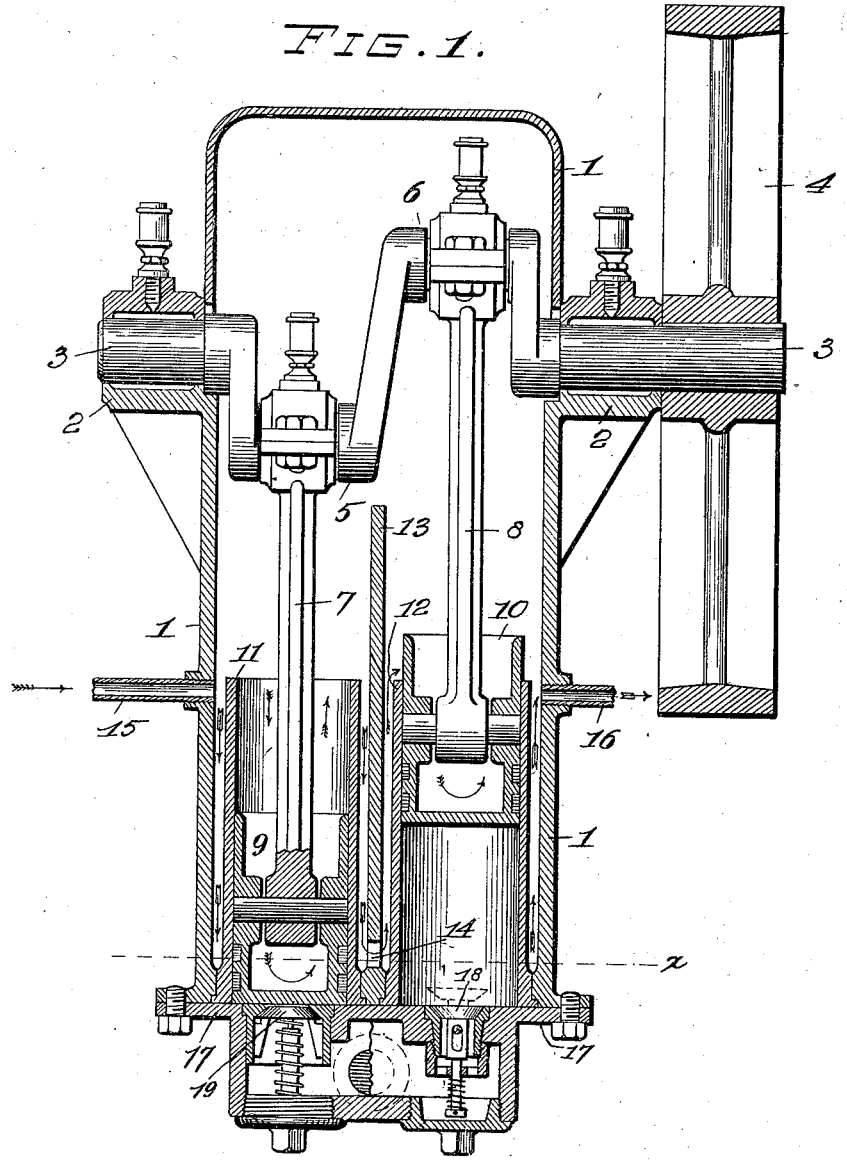
Figure 2:
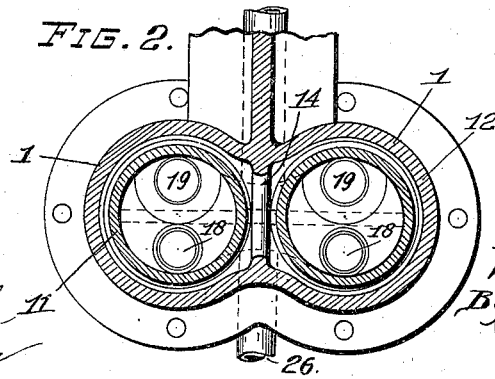

Referring to the drawings which illustrate my invention, Figure 1 shows a vertical section of the entire device. Fig. 2 shows a horizontal section taken along the line $xx$ of Fig. 1.

1 is a shell or casing in which is suitably journaled at 2 the shaft 3. This shaft 3 is propelled by the drive-wheel 4, which in turn is driven from any suitable source of power.

On the shaft 3 and within the shell 1 are the two cranks 5 and 6, which operate the piston-rods 7 and 8. The plungers 9 and 10 work in the cylinders 11 and 12, hereinafter described.

The shell 1 is cast in one piece, excepting the bottom, which may be left open or made removable, and is provided with a plurality of spaces for the compression-cylinders. Two are shown in the drawings, but more may be provided. Between each pair of such cylinders I place a partition-plate 13, which extends from the bottom of the shell to a height considerably above the tops of the cylinders, as shown. At the bottom of this partition-plate is an opening 14, through which water is adapted to circulate. 15 is the inlet water-pipe and 16 the exit-pipe. It will be seen that water freely distributes itself and circulates between the shell and cylinders, and since said cylinders and plungers are open at the top circulation is also effected within the same and directly above the piston. The partition-plate 13 is preferably cast integral with the shell 1. The cylinders 11 and 12 are fitted into the shell 1 from the bottom and held in place by the valve-chamber plate 17, bolted thereon. In this plate are placed inlet-valves 18 and outlet-valves 19, coincident with the cylinder-chambers.

Having thus described my invention, what I claim as new, and desire to secure by Letters Patent, is—

1. In an air-compressor, the combination with a series of compression-cylinders of an outer surrounding shell for containing a cooling medium having a dividing-partition separating the shell into chambers, each containing a cylinder, substantially as described.

2. In an air-compressor, the combination with a series of compression-cylinders of an outer surrounding shell for containing a cooling medium having a dividing-partition separating the shell into chambers, each containing a cylinder, said dividing-partition being provided with an opening in its lower portion, substantially as described.

3. In an air-compressor, the combination with a series of compression-cylinders of an outer surrounding shell for containing a cooling medium having a dividing-partition separating the shell into chambers, and an open-top inserted cylinder and plunger adapted to permit the circulation of the cooling medium outside and inside the said cylinder and plungers, substantially as described.

WM. D. HOOKER.

Witnesses:
   JOS. A. TAYLOR,
   THOMAS RIELLEY.